US012619771B2

(12) United States Patent
Lai et al.

(10) Patent No.: US 12,619,771 B2
(45) Date of Patent: May 5, 2026

(54) SECURE ELEMENT FOR A DEVICE

(71) Applicant: THALES DIS FRANCE SAS, Meudon (FR)

(72) Inventors: Qi Rong Lai, Singapore (SG); Harmony Stephanie Yu Ang, Singapore (SG); Junjie Daniel Ngui, Singapore (SG); Fabien Courtiade, Ceyreste (FR); Gerald Maunier, Sanary (FR); Januar Lianto, Singapore (SG); Tung Shen Ang, Singapore (SG)

(73) Assignee: THALES DIS FRANCE SAS, Meudon (FR)

( * ) Notice: Subject to any disclaimer, the term of this patent is extended or adjusted under 35 U.S.C. 154(b) by 96 days.

(21) Appl. No.: 18/291,582

(22) PCT Filed: Jun. 30, 2022

(86) PCT No.: PCT/EP2022/068121
§ 371 (c)(1),
(2) Date: Jan. 24, 2024

(87) PCT Pub. No.: WO2023/006332
PCT Pub. Date: Feb. 2, 2023

(65) Prior Publication Data
US 2025/0094621 A1 Mar. 20, 2025

(30) Foreign Application Priority Data
Jul. 27, 2021 (EP) .................................... 21306039

(51) Int. Cl.
*G06F 21/62* (2013.01)

(52) U.S. Cl.
CPC ................................ *G06F 21/6245* (2013.01)

(58) Field of Classification Search
CPC .................................................... G06F 21/6245
See application file for complete search history.

(56) References Cited

U.S. PATENT DOCUMENTS 8,335,901 B2 * 12/2012 Kawamura ......... G06F 11/1417
                                                        711/E12.103
8,806,199 B2 * 8/2014 von Behren .......... G07F 7/1008
                                                        380/278

(Continued)

OTHER PUBLICATIONS

International Search Report (PCT/ISA/210) and Written Opinion (PCT/ISA/237) mailed on Oct. 27, 2022, by the European Patent Office as the International Searching Authority for current International Application No. PCT/EP2022/068121—[10 pages].

(Continued)

*Primary Examiner* — Frantz B Jean

(57) ABSTRACT

A secure element for a device includes an operative system the secure element including a first security applet configure to communicate with the device operative system, wherein the first security applet is configure to accept any first external application, after performing a key registration, as a local administrator application for some first data provided by the first external application, so that no other external application may access the first data without a permission of the first external application. The disclosure also provides a telecommunications device and a method of management of secure information in such a secure element.

14 Claims, 10 Drawing Sheets

(56) References Cited

U.S. PATENT DOCUMENTS

| | | | |
|---|---|---|---|
| 2007/0192840 A1* | 8/2007 | Pesonen | G06F 21/31 |
| | | | 726/5 |
| 2014/0189880 A1* | 7/2014 | Funk | H04L 63/104 |
| | | | 726/27 |
| 2020/0065081 A1* | 2/2020 | Lee | G06F 21/6245 |
| 2021/0014682 A1* | 1/2021 | Kamal | H04W 8/205 |

OTHER PUBLICATIONS

Globalplatform: "GlobalPlatform Device Technology Secure Element Access Control Version 1.1", Sep. 30, 2014 (Sep. 30, 2014), XP055539898, Retrieved from the Internet: URL:https://globalplatform. org/wp-content/uploads/2014/10/GPD_SE_Access_Control_vl. 1.pdf; [retrieved on Jan. 9, 2019]; Section 2.1; Section 3.

* cited by examiner

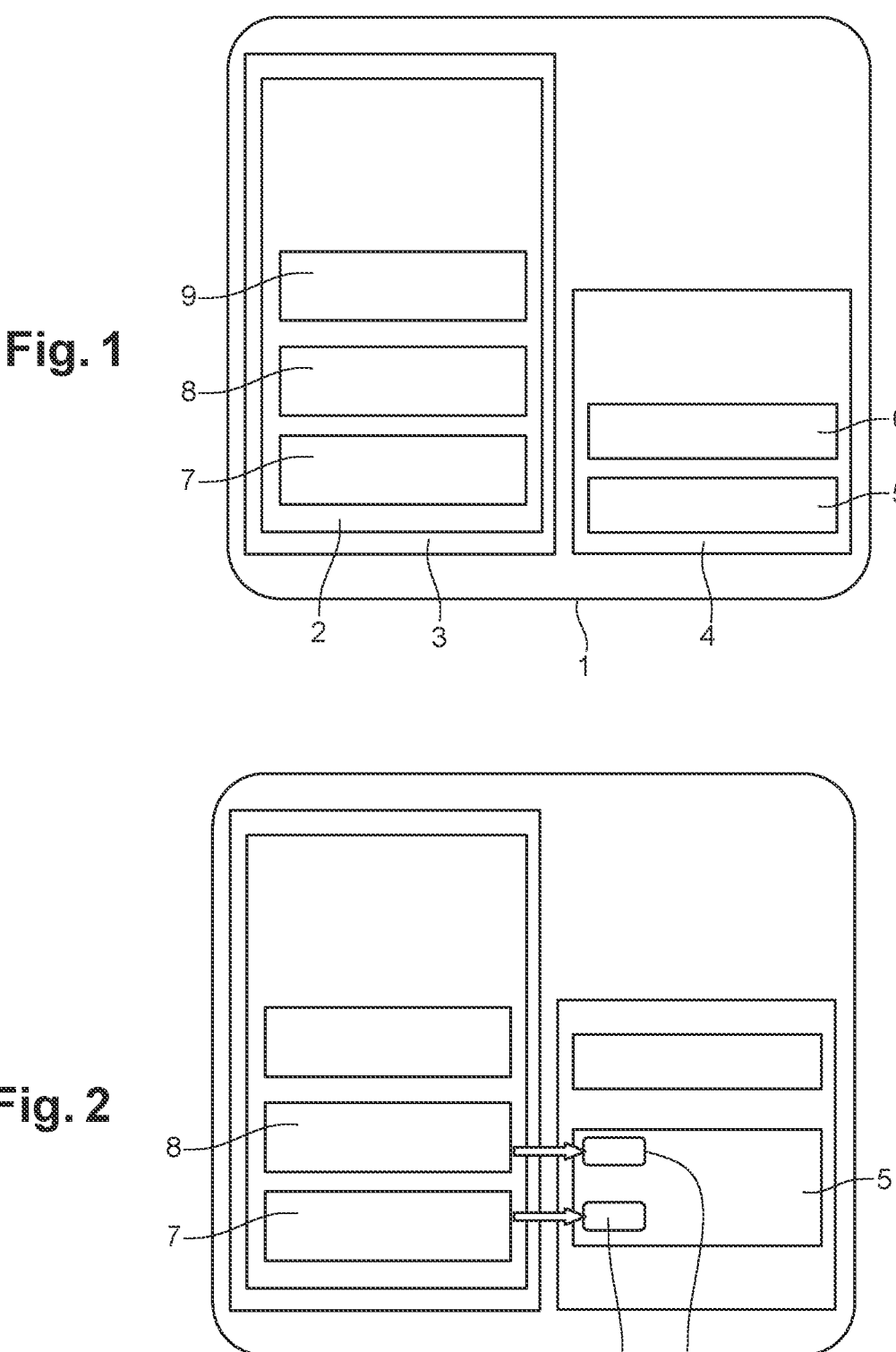

SECURE ELEMENT FOR A DEVICE

TECHNICAL FIELD

This invention belongs to the field of managing the secure elements comprised in user devices, such as mobile phones.

BACKGROUND

As known, some user devices, such as mobile phones,
store the user's private information in a dedicated secure
element (SE), such as integrated or dedicated security chips,
that are located in the same user device, but as a separated
hardware, also comprising their own software.

Any external application (understood as an application
designed to work in the operative system of the user device)
may have access to the information contained in the SE.
However, this access must be ensured to happen in a secure
environment, avoiding that the external application may
have access to unnecessary information stored in the SE.

Some solutions to these problems have been disclosed.
For example, GlobalPlatform Secure Element Access is a
solution to regulate the access of the external applications to
the SE. However, when an external application has a granted
access to the SE, this external application is free to send
commands to the SE, and any data may be accessed by third
parties.

Another existing solution, such as Secure Channel Pro-
tocols (SCP), rely on keys stored in the Security Domain
(SD). This implies that any external Mobile Application
which is able to authenticate to the SD will be allowed
access to any SE Applet which relies on an authentication to
the SD. The SE Applet cannot differentiate between two
different Mobile Applications which has successfully per-
formed an authentication. This problem is usually dealt with
by combining the isolation of the SE Applications into
different SDs to avoid illegal access from different external
Mobile Applications, with access condition management
from High Level Operating System (HLOS). This makes
deployment on card even more complicated.

One other challenge with using the SCP to cipher the
communication is that the mobile application will either
need to have permanent access to a Trusted Services Man-
ager (TSM) or store the SD's symmetric keys locally
themselves which required them to first have access to TSM
servers. The need to have access to the TSM servers creates
challenges when deploying on the field, especially when the
mobile application is only performing a local access to the
secure element.

Another problem with using SCP is that the SD keys are
not always loaded by the service provider themselves, rather
they will need the help of the Secure Element Issuer (SEI)
TSM to do so. Some service providers may not trust that the
keys at some point have passed through a third party entity.

The present invention provides an alternative solution to
the problem of managing the security in the access of
external applications to the security element of a user's
device.

SUMMARY

The invention provides an alternative solution for this
problem by means of a secure element according to claim 1.
Preferred embodiments of the invention are defined in
dependent claims.

Unless otherwise defined, all terms (including technical and scientific terms) used herein are to be interpreted as is customary in the art. It will be further understood that terms
in common usage should also be interpreted as is customary
in the relevant art and not in an idealised or overly formal
sense unless expressly so defined herein.

In this text, the term "comprises" and its derivations (such
as "comprising", etc.) should not be understood in an
excluding sense, that is, these terms should not be inter-
preted as excluding the possibility that what is described and
defined may include further elements, steps, etc.

In a first inventive aspect, the invention provides a secure
element for a device comprising an operative system, the
secure element comprising a first security applet configured
to communicate with the device operative system, wherein
the first security applet is configured to accept any first
external application, after performing a key registration, as
a local administrator application for some first data provided
by the first external application, so that no other external
application may access the first data without a permission of
the first external application.

This invention introduces the direct communication
between an external application and a first applet of the
security element. The first external application only needs a
key exchange with the first applet of the security element to
obtain an "administrator role" over their own first data.

A "device", in the sense of this invention, should be
understood as any device with an operative system which is
configured to transmit or receive electronic communications
with an external operator. Although telecommunications
devices, such as computers, mobile phones or tablets are the
best example thereof, the invention is not limited to these
devices. Any other case, involving internet of things (e.g.,
car sharing app or parking app or virtual car key app with a
car using its own operative system) are also within the scope
of protection of the invention.

A "secure element", in the sense of this invention, should
be understood as any element which is configured to store
and exchange any secure data with the operative system of
the device.

An "external application", in the sense of this invention,
should be understood as any program configured to be
installed in the device, especially in the device operative
system.

A "key exchange", in the sense of this invention, should
be understood as any sequence of operations where each
party sends the public part of his key pair to the other one
as it becomes a way to authenticate to the other party.

The first (or second, or third) data, in the sense of this
invention, should be understood as a key, a string, a blob or
any other piece of info that may be securely read or used.

In some particular embodiments, the first security applet
is configured to accept that the first external application may
delegate either the access to the first data or specific access
permissions to some external applications, such as, for
example, a local administrator role similar to the role of the
first external application, so that more than one external
application may manage the access to the first data.

Once the first external application has become a local
administrator application for its own data, the permission to
access (or even to read/write) over these data may be
delegated to other external applications.

The first external application, when delegating access to
different delegated applications, apply in some embodiments
the fine-grained authorization concept up to resource level
(i.e., to the level of particular external applications), so that
some specific applications may have specific rights (read/
write/delete/create over all or selected data).

The first external application may inform the first security applet that the first data allows more than one application being the administrator thereof. Then, the first security applet may grant this administrator role to different applications. Each one of these applications would have an administrator role for the first data, so that they could freely access to this first data (not to the data managed by other external applications, unless allowed) and more than one external application could designate new delegated apps.

In some particular embodiments, the first security applet is configured to require a token authorization for any external application to become local administrator for their corresponding data.

In some cases, the first security applet comprised in the secure element is thus able to manage the access and usage of its storage, by means of a permissions management system. Since the storage size is not endless, it may be useful in some cases, where specific restrictions or monetization by profile are intended.

In some particular embodiments, the first security applet is configured to accept a main external application as main administrator application for the first security applet, and further configured to confer the main external application the ability to access any data stored in the first security applet and/or the ability to confer further external applications the permission to access any data stored in the first security applet.

A main administrator may be useful in some cases, when an access to many different pieces of information is to be centralized.

In some particular embodiments, the first security applet is configured to establish a relation with the first external application so that any communication between them begins with a secure messaging session established by an authentication.

Since the local administrator role has been established previously, the first security applet ensures, by the secure messaging session, that it is the administrator application the one which tries to access the corresponding data.

In some particular embodiments, the first external application is configured to be installed by a user.

In these cases, the first external application, which is recognized by the first security applet as an administrator application for its first data, is not a pre-installed application, but an application that may be installed by the phone's user in any moment.

In some particular embodiments, the secure element comprises more than one security applet.

The scheme and features associated in the different embodiments to the first security applet may be extended accordingly to additional security applets.

In some particular embodiments, the first security applet is configured to provide a service, e.g., store secret values, generate keys, perform computations etc for the external administrator application and at least some of them for delegated applications.

In some particular embodiments, the first security applet is configured to recognize more than one external application as local administrator application for their corresponding data, so that no other external application may access the corresponding data without a permission of the corresponding external application.

The storage of the first security applet may be divided in watertight compartments, so that the data of one compartment is managed by one local administrator application and no other external application (even local administrators of other compartments) may access these data without the permission of the corresponding local administrator.

These embodiments present the possibility that a second external application, different from the first external application, may become the administrator of some second data, different from the first data. Both first and second external applications would share the features of the first security applet, but each one of them would have the ability to decide about the access to their respective data: the first external application would have the right to regulate the access to the first data before any other external application (including the second external application) and the second external application would have the right to regulate the access to the second data before any other external application (including the first external application).

This device guarantees the confidentiality and integrity of the communication between a SE Applet and a Mobile Application without knowledge of SD keys.

In a second inventive aspect, the invention provides a telecommunications device comprising a secure element according to the first inventive aspect.

In a further inventive aspect, the invention provides a method of management of secure information in a secure element according to the first inventive aspect, the method comprising the steps of a first external application which has not had any previous contact with the first security applet request a local administrator permission for some first data provided by the first external application;

the first security applet, after performing a key registration, accepts the first external application as local administrator for the first data, so that no other external application may access the first data without a permission of the first external application.

In some particular embodiments, the method further comprises the steps of a further external application request the first external application a permission to access the first data in the first security applet;

the first external application initiates a secure session to store the first data in the security applet;

the first external application, after a key registration, confers the further external application the permission to access the first data in the first security applet; and the further external application establishes a secure session with the first security applet to access the first data.

In some particular embodiments, the method further comprises the steps of

A second external application which has not had any previous contact with the first security applet request a local administrator permission for some second data provided by the second external application;

the first security applet, after performing a key registration, accepts the second external application as local administrator for the second data, so that no other external application may access the second data without a permission of the second external application.

In some particular embodiments, the method further comprises the steps of

A fourth external application, which may be different or not from the first external application, requests the first security applet to become a main administrator The first security applet, after a key registration, accepts the fourth external application as the main administrator

a fifth external application requests the fourth external application a local administrator permission for some third data provided by the fifth external application;

the fourth external application, after performing a key registration, accepts the fifth external application as local administrator for the fourth data, so that no other external application may access the fourth data without a permission of the fourth external application or of the fifth external application.

In some particular embodiments, the method further comprises the steps of

A fourth external application performs a key registration together with a token with the first security applet The first security applet discerns if the token is acceptable If the token is acceptable, the first security applet accepts the fourth external application as local administrator for some third data, so that no other external application may access the third data without a permission of the fifth external application.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a particular embodiment of a mobile phone device according to the invention.

FIG. 2 shows a particular arrangement of a mobile phone according to the invention.

DETAILED DESCRIPTION

Figure 3:
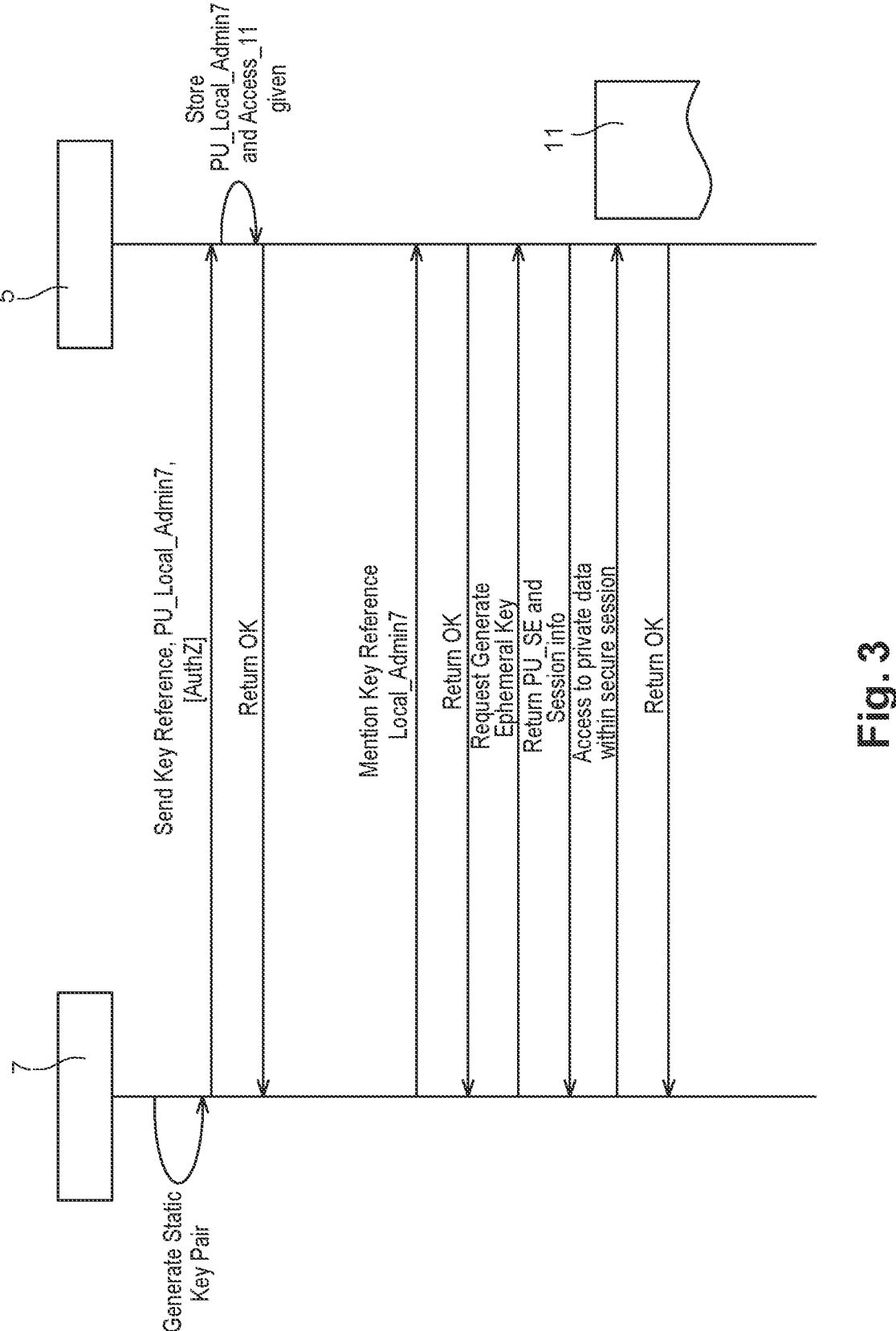
FIGS. 3 and 4 show diagrams with some steps of a method according to the invention performed in the mobile phone of FIG. 2.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a device, which in this case is a mobile phone 1, which comprises an operative system 2, an internal memory 3; and a secure element 4 isolated from the internal memory 3.

The secure element 4 is configured to communicate with the operative system 2 of the device, when storing and using some private information, when some application may require the use of this private information.

The private information referred in the present invention is not pre-installed in the secure element, but is information provided and managed by some external applications working in the operative system.

The secure element comprises a plurality of security applets 5, 6, which are in charge of managing the information to be stored in the secure element.

One of these security applets will be called first security applet 5 and, in the example of this figure, is configured to receive the requests of external applications 7, 8, 9. External applications 7, 8, 9 are applications to be installed by the user in the operative system of the mobile phone.

FIG. 2 shows a particular embodiment of a device according to the invention, wherein the first security applet 5 contains a first data 11 provided by a first external application 7 and a second data 12 provided by a second external application 8.

Figure 4:
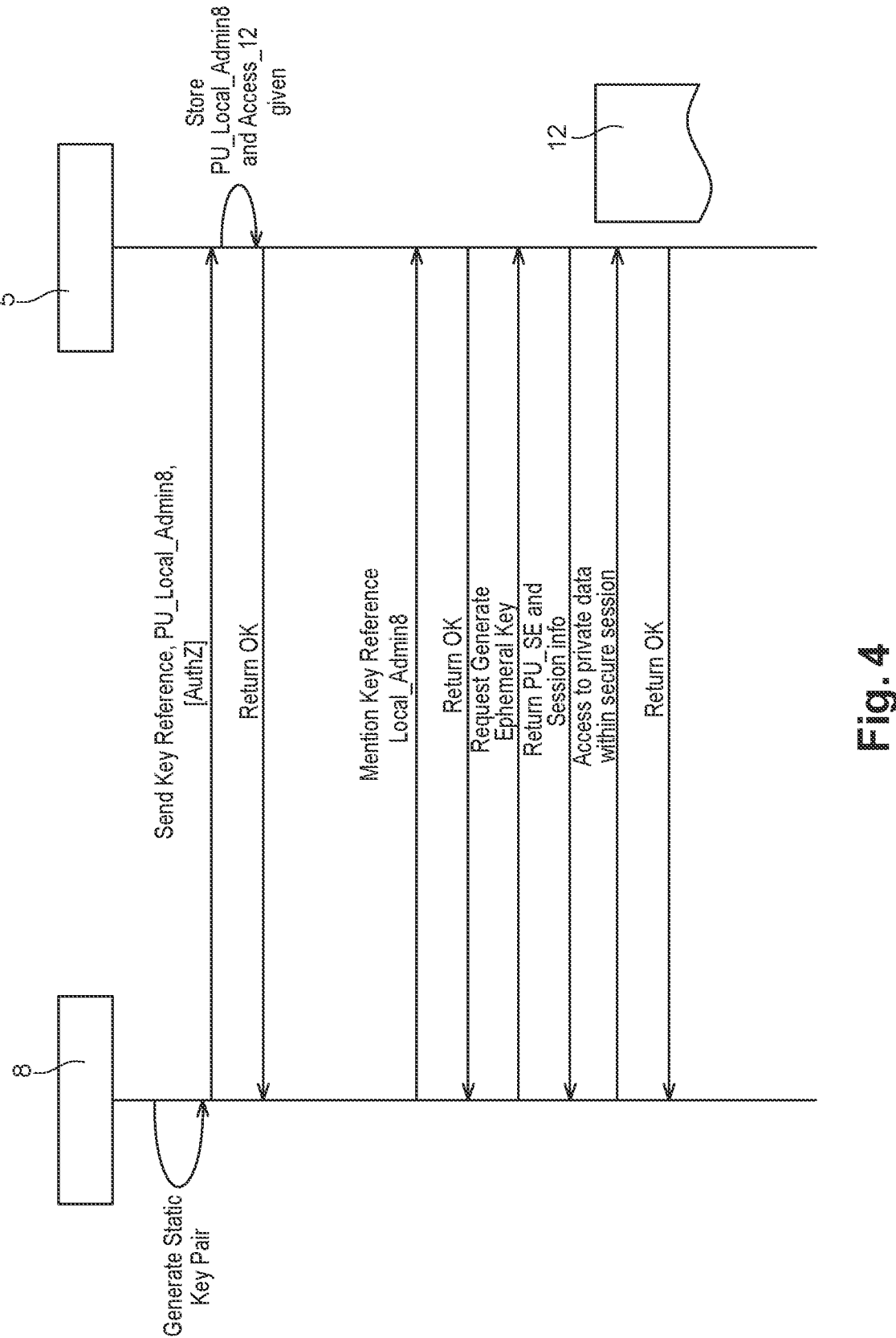

FIGS. 3 and 4 show diagrams with some steps of a method according to the invention. In this case, they are based on the device of FIG. 2. Concerning FIG. 3, in the upper part of the figure, the first external application 7, which has not had any previous contact with the first security applet 5, sends a request by means of a key pair exchange, to become the administrator, before this first security applet 5, of some private first data, which will be provided later by the same first external application 7. The first security applet 5 is configured to recognize this first external application 7, after performing a key exchange, as the local administrator application for the first data 11, so that no other external application may access the first data without a permission of the first external application.

The use of a token authorization (AuthZ) is optional, and may be used in some cases.

In the lower portion of this diagram, it is seen the access of this first external application 7 to its own piece of private data (the first data 11) within the context of a secure session established with the first security applet 5. Since the first external application 7 has acquired the status of local administrator of the first data 11, this access is allowed.

Hence, in the method illustrated in this figure, the first external application 7 only needs a key exchange with the first applet 5 of the security element to obtain a "local administrator role" over their own first data.

Then, if a further external application wants to access this first data stored in the first security applet, this further external application must require a permission.

FIG. 4, also based on the device of FIG. 3, shows a second external application 8 repeating the steps performed by the first external application 7 with respect to the first security applet 5 in FIG. 3, but in this case with respect to its own piece of private information (the second private data 12), to which the second external application 8 is the local administrator.

Figure 5:
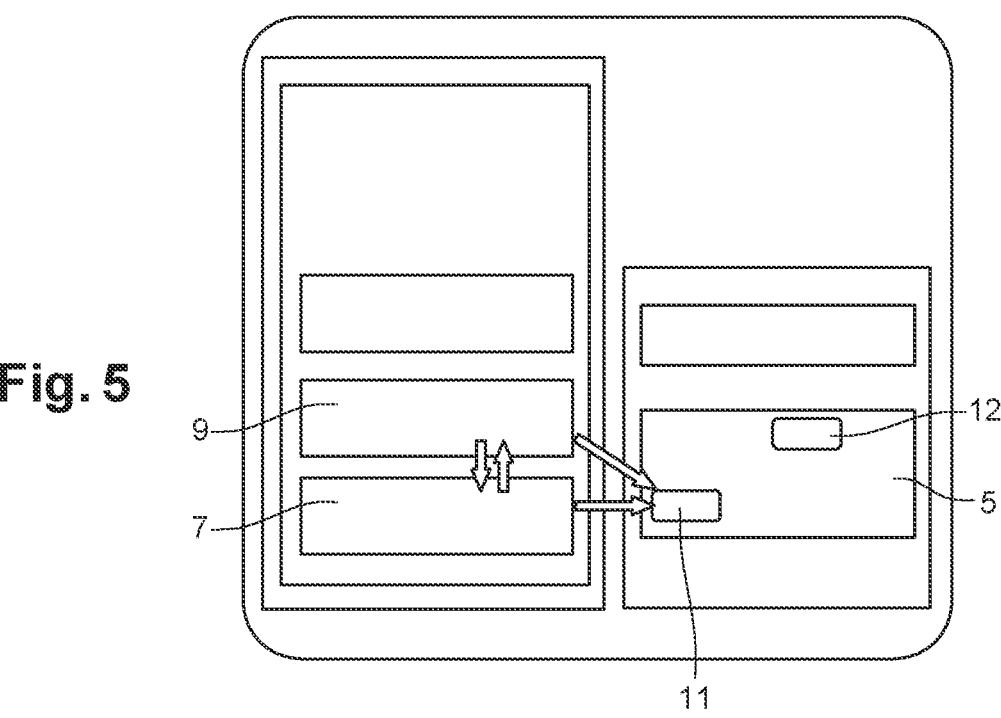
FIG. 5 shows a particular arrangement of a mobile phone according to the invention.

FIG. 5 shows a particular embodiment of a device according to the invention, wherein the first security applet 5 contains a first data 11 provided by a first external application 7 (this first external application 7 being local administrator of this first data 11) and a second data 12 provided by a second external application (this second external application, not shown, being local administrator of this second data 12).

In this case, the first external application 7 is delegating the access to their own data 11 when a further external application 9 requests the first external application 7 (which is the "local administrator" over the first data 11) to access to the first data 11.

Figure 6:
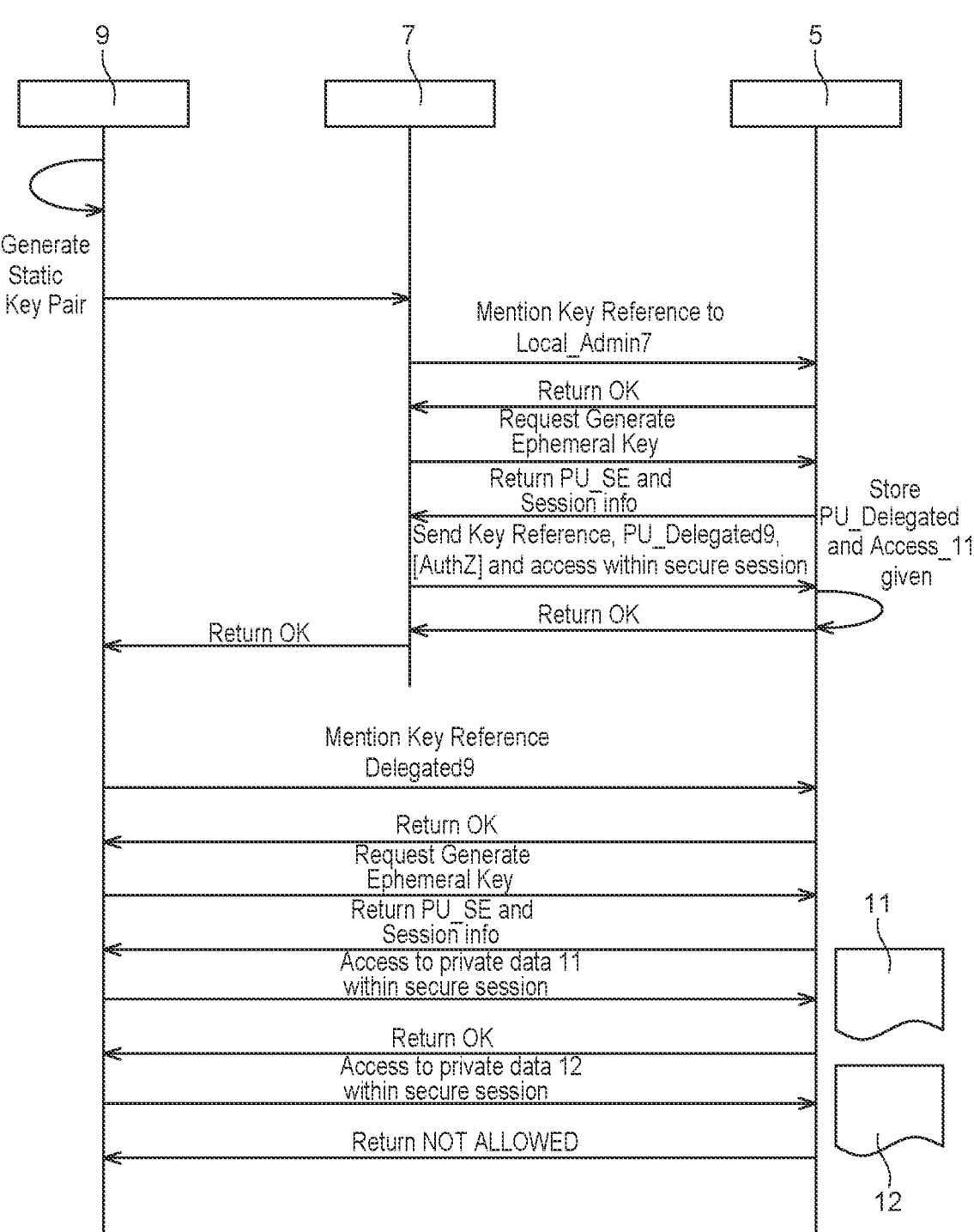
FIG. 6 shows a diagram with some steps of a method according to the invention performed in the mobile phone of FIG. 5.

FIG. 6 shows a diagram where this action is being detailed. The further external application 9 requests this access to the first external application 7, which is the local administrator over the first data 11. The first external application 7 sends the delegation key to the first security applet 5 and then, after establishing the secure session with the delegated key, the ok is returned to the further external application 9.

Then, as shown in the lower portion of the diagram, the further external application 9, by means of the delegated key, is able to access to the first data 11 (the one which is administrated by the first external application 7), but is not able to access to any other data, such as the second data 12, which is not administrated by the first external application 7, which is the application that has delegated its role. Since the first external application 7 was not authorized to access the second data 12, the delegated application 9 is not authorized to access to it either.

In some cases, access delegation is defined ad hoc for some external applications: the first external application, when delegating access to different delegated applications, apply in some embodiments the fine-grained authorization concept up to resource level (i.e., to the level of particular external applications), so that some specific applications may have specific rights (read/write/delete/create) over all or just a selected portion of data.

In fact, in some cases, the first external application (local administrator) may delegate to another external application the permission to become local administrator (and in turn be able to delegate the access to the first data to further external applications).

Figure 7:
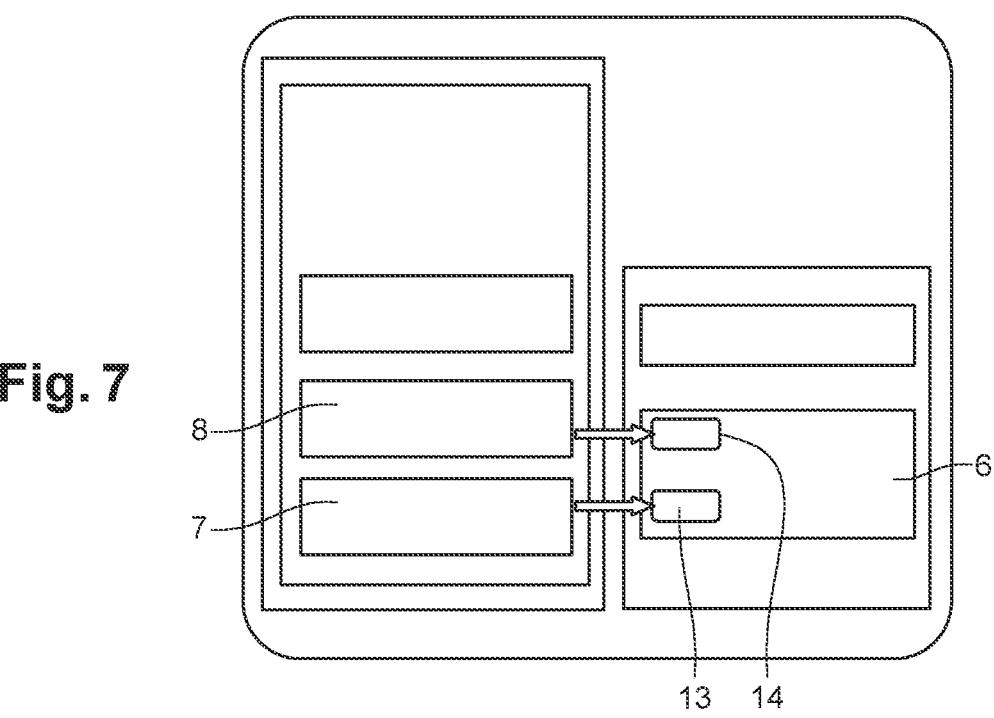
FIG. 7 shows a particular arrangement of a mobile phone according to the invention.

FIG. 7 shows a particular embodiment of a device according to the invention, wherein now the second security applet 6 contains a third data 13 provided by a first external application 7 (this first external application 7 being local administrator of this third data 13) and a fourth data 14 provided by a second external application 8 (this second external application 8 being local administrator of this fourth data 14).

In this case, the first external application 7 is becoming the main administrator before the second security applet 6, thus acquiring permissions to access, not only its own private information (the third data 13) but also any other piece of information stored in the corresponding security applet, such as the fourth data 14.

Figure 8:
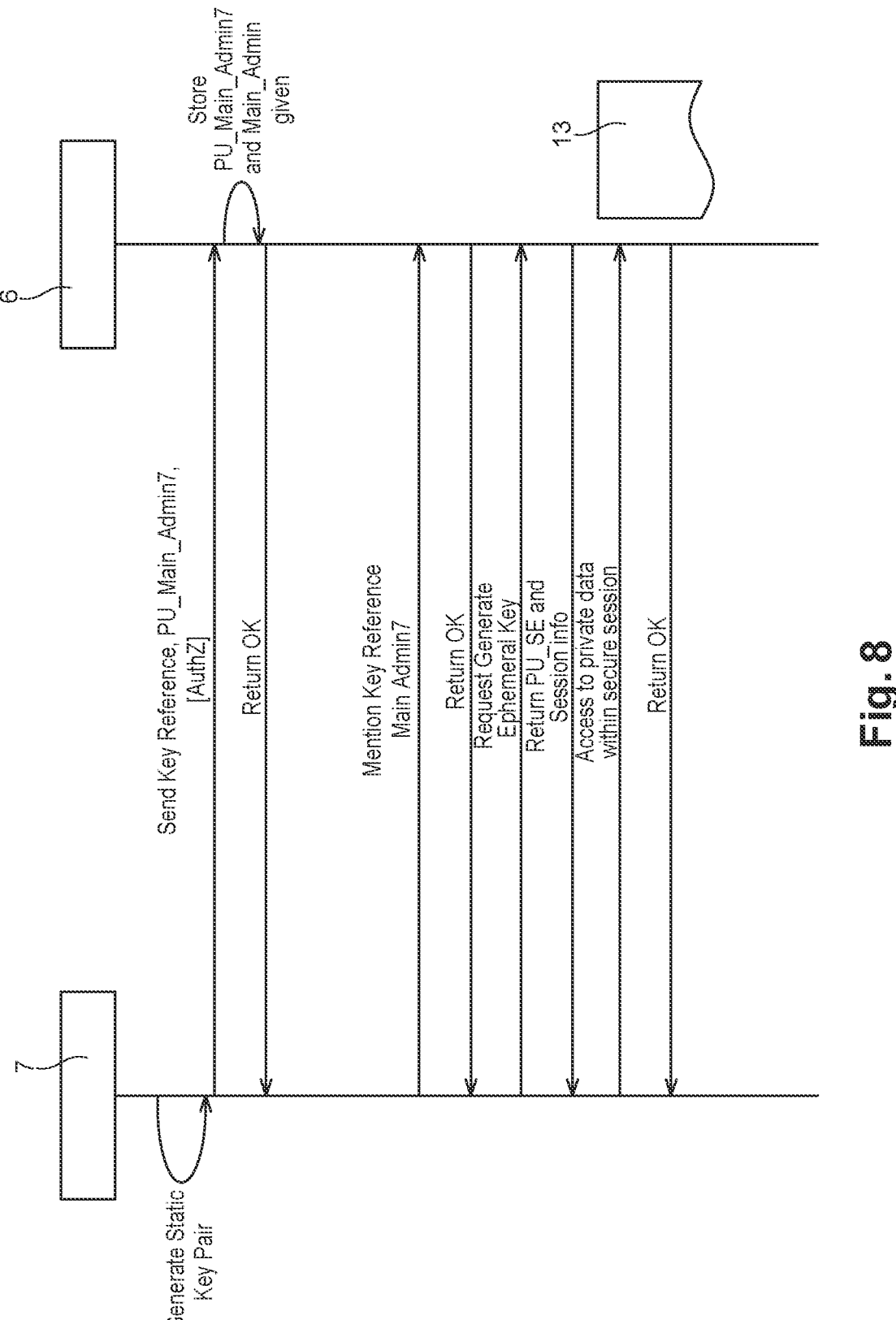
FIGS. 8 and 9 show diagrams with some steps of a method according to the invention performed in the mobile phone of FIG. 7.

FIG. 8 shows a diagram to detail the steps of a method according to the invention. These steps are referred to the device of FIG. 7. In this case, the first external application 7 requests, by a key exchange with the second security applet 6, becoming the main administrator application. After this key exchange, the first external application 7 becomes the main administrator application before the second security applet 6.

As seen in the lower portion of the diagram, after this main administrator has taken over its position, the main administrator 7 is authorized to access to the third data 13.

Figure 9:
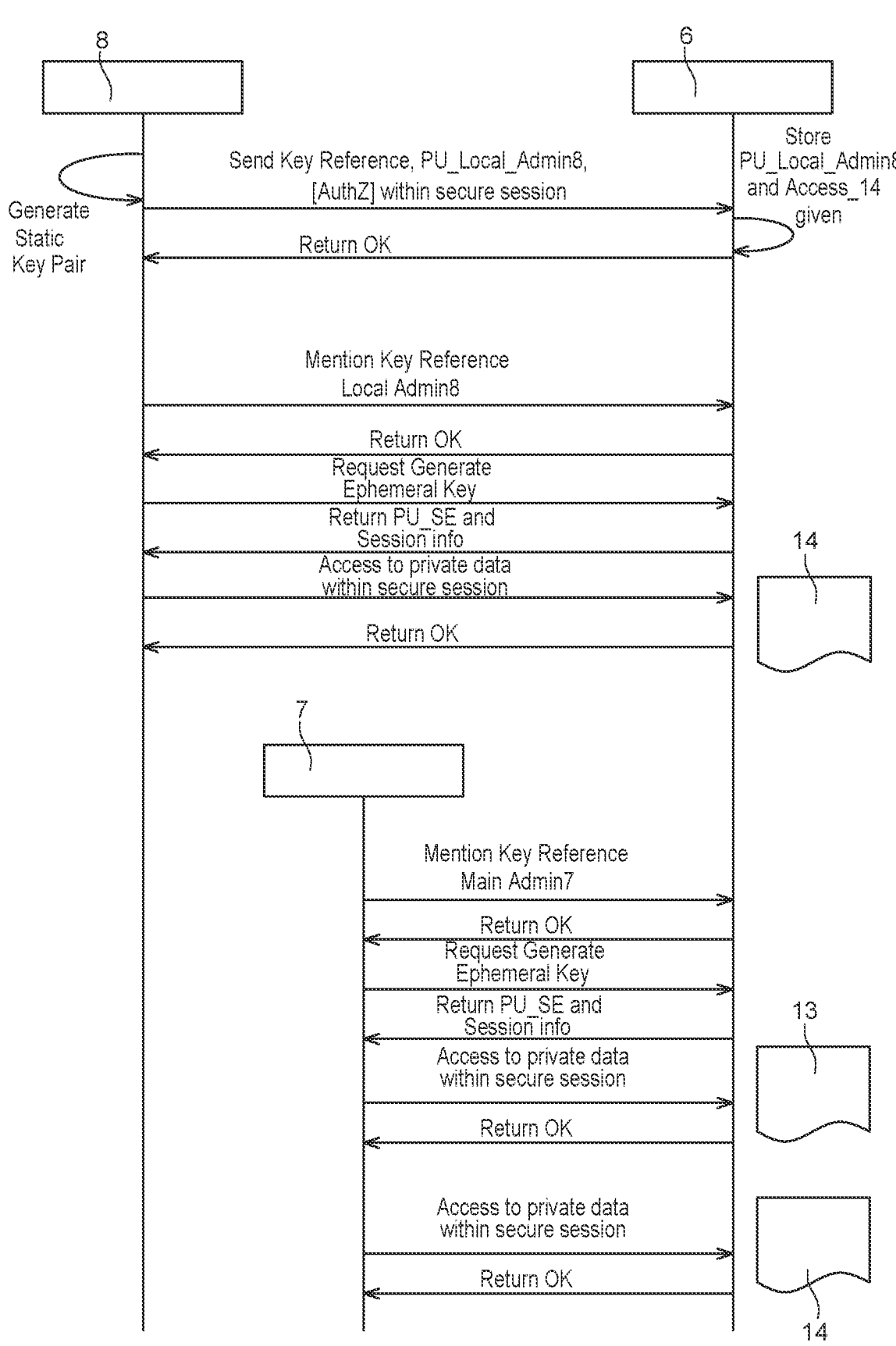

FIG. 9 shows a diagram to detail some other steps of a method according to the invention. In this case, with the embodiment of FIG. 7, the second external application 8, as local administrator of the fourth data 14, establishes a secure session to access its own data 14, the same as in other examples of relations between a local administrator and the corresponding security applet concerning a particular piece of data.

In this figure, the main administrator 7 is now able, without a further action, to access, not only its own private data (the third data 13) but also any other data stored in the same security applet (the second security applet 6). By means of a key registration, the secure session is established and the main administrator 7 has access both to the third data 13 and to the fourth data 14.

Figure 10:
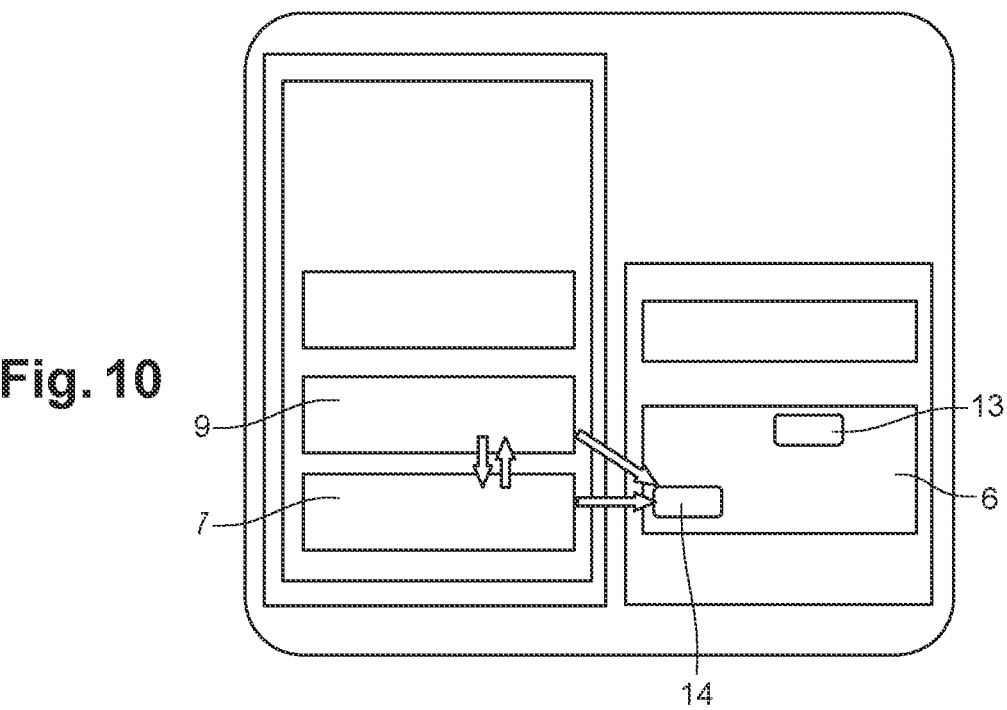
FIG. 10 shows a particular arrangement of a mobile phone according to the invention.

FIG. 10 uses the device of FIG. 7 but with a further external application 9. In this case, the first external application 7 has become main administrator before the second security applet 6, and a further external application 9 requests an access to the fourth data 14.

Figure 11:
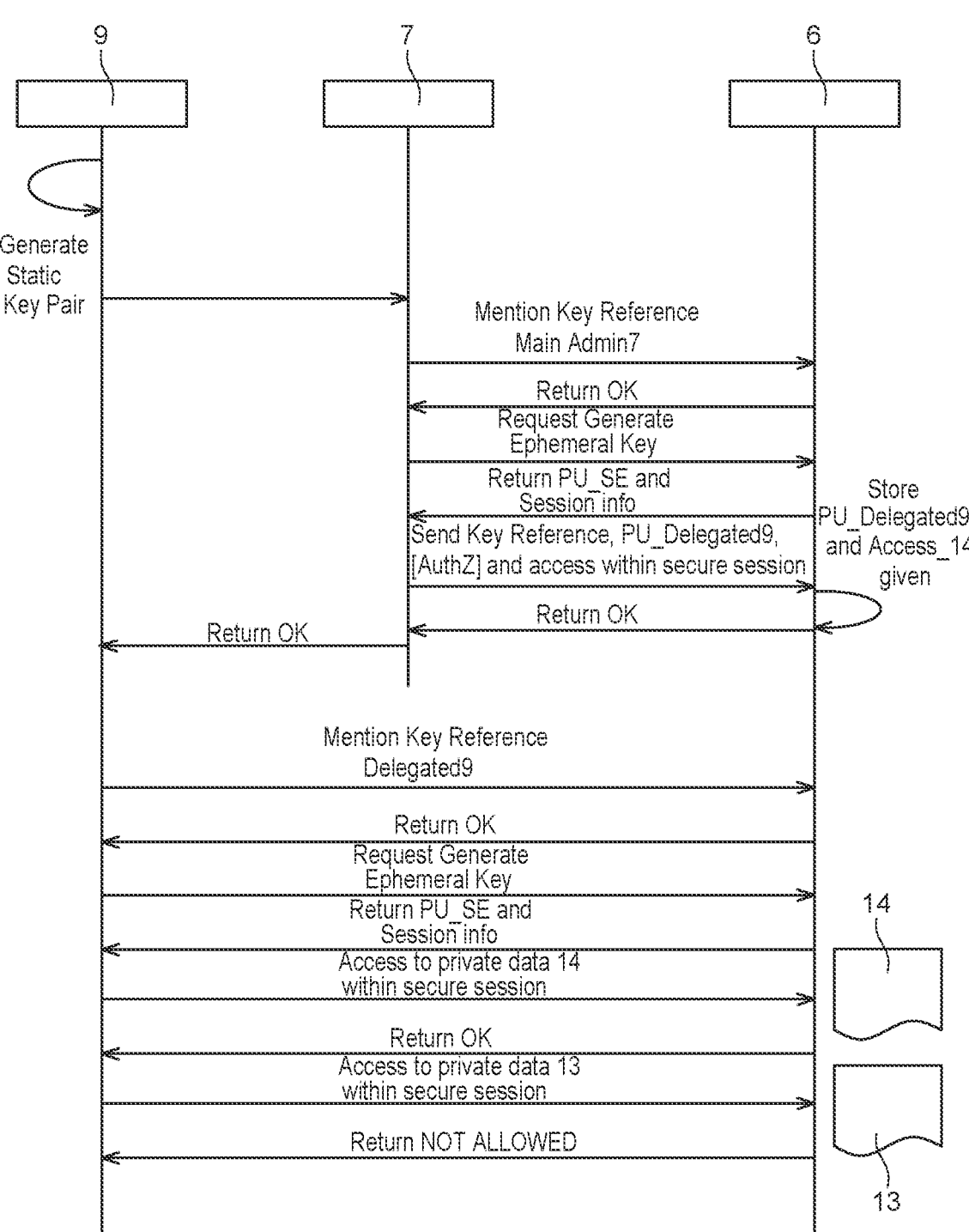
FIG. 11 shows a diagram with some steps of a method according to the invention performed in the mobile phone of FIG. 10.

FIG. 11 shows a diagram of how these elements interact. The further external application 9 requests the main administrator (i.e., the first external application 7) an access to the fourth data 14. The second security applet 6 stores the PU_Delegated9 and the further external application 9 is delegated to access this fourth data 14.

In the lower portion of the diagram, the further external application 9 uses the delegated key to request the second security applet 6 an access to the fourth data 14 within a secure session. This access is granted, but access to any other data (such as the third data 13) is not allowed, since permission was requested to the main administrator only for the fourth data 14.

The invention claimed is:

1. A secure element for a device comprising an operative system, the secure element comprising a first security applet configured to communicate with the device operative system, the device operating system comprising a first external application, the first security applet and the first external application being configured for:

performing a key exchange procedure between the first security applet and the first external application, and if the first security applet recognizes the first external application, authorizing the first external application by the first security applet to become a local administrator application for data, called first data, provided by the first external application, in order to forbid access to the first data to any other external application without a permission of the first external application, and without requiring access control managed by rules stored at the secure element.

2. The secure element of claim 1, wherein the first security applet is configured to accept that the first external application may delegate either the access to the first data or specific access permissions to some external applications, such as, for example, a local administrator role similar to the role of the first external application, so that more than one external application may manage the access to the first data.

3. The secure element of claim 1, wherein the first security applet is configured to require a token authorization for any external application to become local administrator for their corresponding data.

4. The secure element of claim 1, wherein the first security applet is configured to accept a main external application as main administrator application for the first security applet, and further configured to confer the main external application the ability to access any data stored in the first security applet and/or the ability to confer further external applications the permission to access any data stored in the first security applet.

5. The secure element of claim 1, wherein the first security applet is configured to establish a relation with the first external application so that any communication between them begins with a secure messaging session established by an authentication.

6. The secure element of claim 1, wherein the first external application is configured to be installed by a user.

7. The secure element of claim 1, wherein the secure element comprises more than one security applet.

8. The secure element of claim 1, wherein the first security applet is configured to recognize more than one external application as local administrator application for their corresponding data, so that no other external application may access the corresponding data without a permission of the corresponding external application.

9. A telecommunications device comprising a secure element according to claim 1.

10. A method of management of secure information in a secure element according to claim 1, the method comprising the steps of:

a first external application which has not had any previous contact with the first security applet requests a local administrator permission for some first data provided by the first external application; and the first security applet, after performing a key registration, accepts the first external application as local administrator for the first data, so that no other external application may access the first data without a permission of the first external application and without requiring access control managed by rules stored at the secure element.

11. The method of claim 10, further comprising the steps of:

a further external application requests the first external application a permission to access the first data in the first security applet;

the first external application initiates a secure session to store the first data in the security applet;

the first external application, after a key registration, confers the further external application the permission to access the first data in the first security applet; and the further external application establishes a secure session with the first security applet to access the first data.

12. The method of claim 10, further comprising the steps of;

a second external application which has not had any previous contact with the first security applet request a local administrator permission for some second data provided by the second external application; and the first security applet, after performing a key registration, accepts the second external application as local administrator for the second data, so that no other external application may access the second data without a permission of the second external application.

13. The method of claim 10, further comprising the steps of:

a fourth external application, which may be different or not from the first external application, requests the first security applet to become a main administrator;

the first security applet, after a key registration, accepts the fourth external application as the main administrator;

a fifth external application requests the fourth external application a local administrator permission for accessing some fourth data comprised in the first security applet; and the fourth external application, after performing a key registration, confers the fifth external application permission for accessing the fourth data.

14. The method of claim 10, wherein the first external application comprises a token and the key registration includes the authorization of the token as a requirement for accepting the first external application as local administrator for the first data.

\* \* \* \* \*